April 14, 1953    M. H. KOWAN ET AL    2,634,776
VEGETABLE AND FRUIT PULPING AND JUICING MACHINE
Filed Aug. 2, 1951
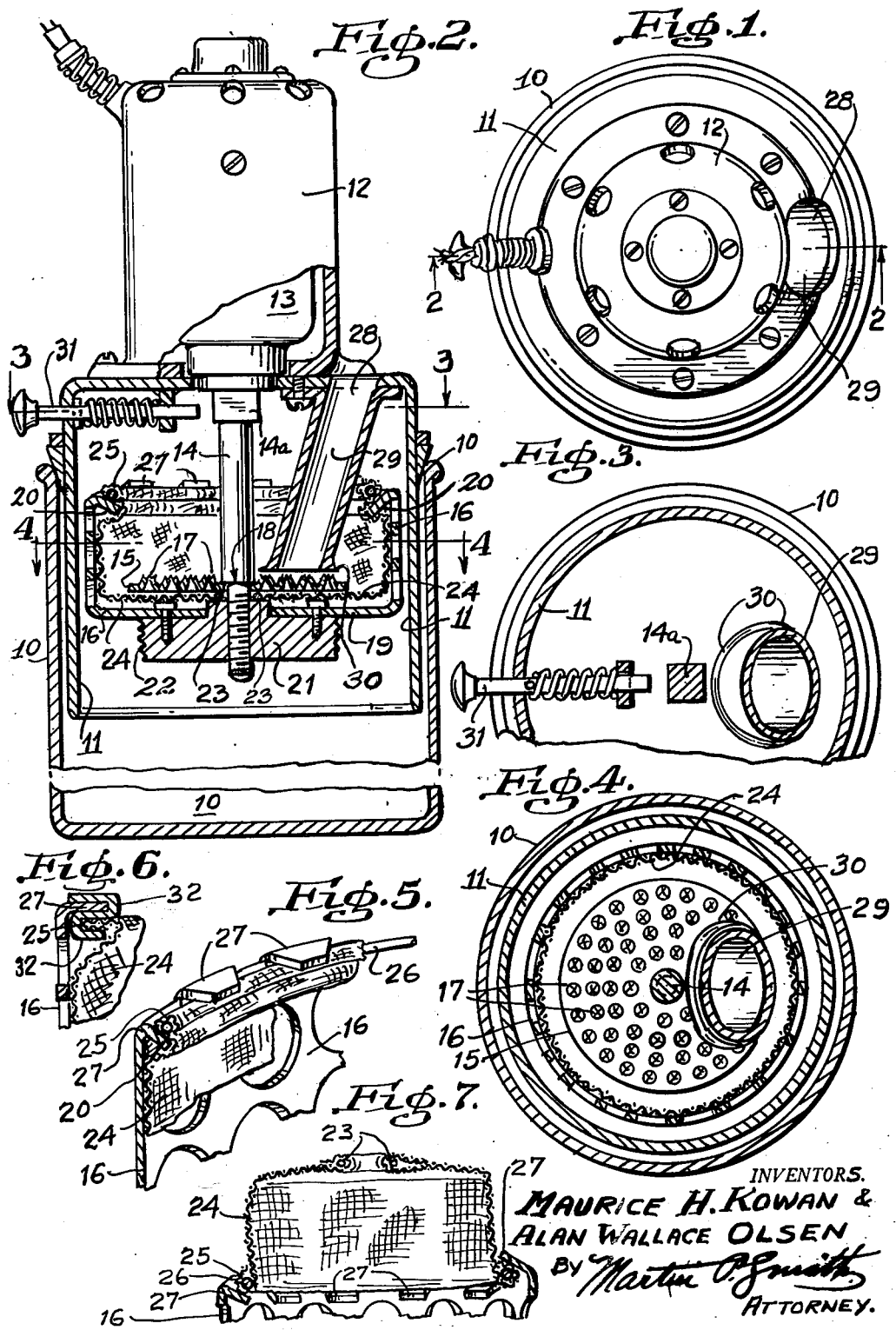
INVENTORS.
MAURICE H. KOWAN &
ALAN WALLACE OLSEN
BY Martin C. Smith
ATTORNEY.

Patented Apr. 14, 1953

2,634,776

UNITED STATES PATENT OFFICE 2,634,776

VEGETABLE AND FRUIT PULPING AND JUICING MACHINE

Maurice H. Kowan and Alan Wallace Olsen, Los Angeles, Calif.

Application August 2, 1951, Serial No. 239,902

2 Claims. (Cl. 146—76)

Our invention relates to a device for the efficient and rapid pulping and juicing of vegetables, fruit, nuts and other food products and has for its principal objects, to provide a simple, inexpensive device adaptable for use by the individual, especially one who is ill, in securing freshly prepared requirement of food juices; further, to provide a pulper and juicer which is capable of being easily and quickly disassembled for cleaning purposes and after cleaning, readily assembled.

A further object of the invention is to provide the pulper and juicer with an electric driving motor and to mount the same in a housing at the top of the complete device, where it may serve as a handle, to construct the device with means depending from the motor housing into a jar or other receptacle for acting upon the vegetables, nuts, fruit and food substances fed thereinto, and further, to construct the pulp and juice receiving bowl and the operating parts of the device so that they may be easily and quickly sterilized.

A further object of this invention is to secure upon the lower end of the motor shaft, a grater which is highly effective in pulping all food substances fed into the machine and said grater operating at motor speed within a surrounding filtering fabric which is removably mounted within a rotating screen or cage, so that all juices produced in the machine will pass through said filtering fabric, directly into the receptacle or container associated with the machine, with minimum contact with the metal in said screen or cage.

A still further object of our invention is to provide in a machine of the class described a filtering bag or receptacle which is capable of being quickly emptied with or without removal, and also, after the pulp has been removed therefrom, to be readily cleansed and easily and quickly replaced by a fresh bag or juice separating element.

With the foregoing and other objects in view, our invention consists in certain novel features of construction and arrangement of parts which will be hereinafter more fully described, claimed and illustrated in the accompanying drawing, in which:

Fig. 1 is a plan view of a vegetable and fruit pulping and juicing machine constructed in accordance with our invention, Fig. 2 is a vertical section taken on the line 2—2 of Fig. 1, Fig. 3 is a horizontal section taken on the line 3—3 of Fig. 2, Fig. 4 is a horizontal section taken on the line 4—4 of Fig. 2, Fig. 5 is a fragmentary sectional perspective of parts of the screen or cage and showing the manner of mounting the filtering bag thereupon, Fig. 6 is a modified construction of the mounting for the filtering bag, Fig. 7 is a vertical sectional view of the cage, showing same removed from the machine and with the filtering fabric pulled out to discharge the pulped material therefrom.

Referring by numerals, to the accompanying drawing, which illustrates a preferred embodiment of our invention, 10 designates a container for the juice, which may be of glass or metal, of proper size to receive the pulper and juicer, and 11 is the open lower ended cylindrical member which is removably fitted in the open top of container 10.

Mounted on top of member 11 is a cylindrical housing 12 which may be grasped in the hand when lifting and handling the juicer, and said container 12, housing an electric motor 13, mounted vertically, and the shaft 14 of which extends down into housing 12 to receive the grater 15 and the screen or cage 16.

Grater 15 is a metal plate, which may have a rolled edge and punched from beneath, to provide a field of upwardly presented sharp points 17 which are effective in engaging and pulping the fruit and vegetables fed into the machine, or it may be a metal disc flat or pyramidal in shape and with a raised rough face.

The lower end of motor shaft 14 is reduced in diameter to form a shoulder 18 against which the grater bears and screen or cage 16, when screwed onto the threaded lower portion of said shaft, secures the grater thereto.

Cage 16 is an open topped receptacle composed of a reticulated wall, having large openings, a bottom 19 and an inturned upper flange 20. This cage serves as a framework to support the filtering membrane.

Secured to the underside of bottom 18 is a centrally arranged weight 21 serving as a fly wheel and the edge of said weight is knurled as designated by 22 to facilitate manipulation when said weight is screwed onto and from the threaded lower end of shaft 14.

When thus screwed onto the shaft 14, the upper central portion of weight 21 bears against a fabric ring 23 formed in the center of a bag 24 of filtering fabric which occupies cage 16 and rests against the wall and bottom thereof, thus clamping said fabric ring against the center of grater 15 and in turn, clamping the latter against shoulder 18 on shaft 14.

The top of bag 24 is formed into a hem 25 and inserted therein is a split metal ring 26, thus providing construction which may be readily shaped into and from a V-shaped groove that is formed by splitting the inturned flange 20 radially to form an annular circle of ears 27, which are bent alternately upward and downward. (See Fig. 5.)

Thus, when cage 16 is withdrawn from member 11, and the grater removed from filtering bag 24, a person may insert a finger in the fabric ring 23 and draw said bag from the cage and remove the waste pulp. (See Fig. 7.)

An inlet opening 28 for the products to be pulped and juiced is formed in the top of member 17, and leading downward therefrom, to a point near the grater, is a feed chute 29, the lower end thereof being extended outward and sharpened to form a cutting edge 30 which cooperates with the roughened face of grater 15 in cutting the products fed into the machine. A brake comprising a spring held plunger 31 is mounted in the top of member 11, and when pressed inward, said brake engages the square portion 14a of shaft 14, thereby holding same against rotation when the cage 16, fabric filtering member 24 and fly wheel 21 are removed from or applied to the motor shaft.

In Fig. 6, we have shown a modified form of the connection between the upper portion of the removable filtering bag and cage, such construction consisting of a split S-shaped ring 32 with the top of bag 24 clamped in the lower portion thereof, thus enabling the upper portion to engage upon flange 25 of cage 16.

In operation, the operation of motor 13 drives grater 15 and cage 16 at high speed and as fruit or vegetables are fed downward through chute 29, they will be very effectively pulped, and the resulting juice will be thrown outward against and through the filtering wall 24, also the cage, and pass downwardly into receptacle 10.

All vegetable fibre which does not pass through the filtering wall will be retained within the filtering bag from whence it may be readily removed as heretofore described.

By filling the container 10 with boiling water sufficient to cover the filtering element 24, all working parts of the device may be easily and quickly cleansed and sterilized.

Thus, it will be seen that we have provided a vegetable and fruit pulper and juicer that is simple in structure, inexpensive of manufacture and very effective in performing the functions for which it is intended.

Various changes in the size, form and construction of the various parts of our improved pulper and juicer may be made and substituted for those herein shown and described without departing from the spirit of our invention, the scope of which is set forth in the appended claims.

We claim as our invention:

1. In a fruit and vegetable pulper and juicer, a housing open at its lower end, an electric motor on the top of said housing, the shaft of which motor extends downward into said housing, a grater on said shaft, a cage on said shaft around said grater, the upper edge of said cage being slotted radially, with the portions of said upper edge between the slots bent to form inwardly projecting, alternately arranged, upwardly and downwardly turned ears, a filtering bag arranged within said cage, a hem formed in the upper end of said bag, and a split ring arranged within said hem and positioned between said upwardly and downwardly turned ears.

2. In a fruit and vegetable pulper and juicer, a housing open at its lower end, a motor on top of said housing, the shaft of which motor extends downward into said housing, a cage rotatably carried by said shaft, a filtering bag carried by said cage, a horizontal grater plate rotatably carried by said shaft within said filtering bag, a feed chute extending from the top of said housing downwardly into the bag, the lower end of the chute terminating closely adjacent the top surface of said grater and extending outwardly and said outwardly extended end being sharpened to form a cutting edge.

MAURICE H. KOWAN.
ALAN WALLACE OLSEN.

References Cited in the file of this patent

UNITED STATES PATENTS

| Number | Name | Date |
|---|---|---|
| 2,109,048 | Lorenzen | Feb. 22, 1938 |
| 2,206,204 | Richli | July 2, 1940 |
| 2,295,922 | Weston | Sept. 15, 1942 |
| 2,311,379 | Gillanders | Feb. 16, 1943 |